US010247589B2

(12) United States Patent
Fuller et al.

(10) Patent No.: US 10,247,589 B2
(45) Date of Patent: Apr. 2, 2019

(54) FLUID LEVEL MONITOR (71) Applicant: KSR IP Holdings, LLC, Wilmington, DE (US)

(72) Inventors: Shaun Fuller, Ridgetown (CA); Rex Qiu, Chatham-Kent (CA)

(73) Assignee: KSR IP HOLDINGS, LLC, Wilmington, DE (US)

( * ) Notice: Subject to any disclaimer, the term of this patent is extended or adjusted under 35 U.S.C. 154(b) by 137 days.

(21) Appl. No.: 15/490,501

(22) Filed: Apr. 18, 2017

(65) Prior Publication Data

US 2017/0307432 A1 Oct. 26, 2017

Related U.S. Application Data (60) Provisional application No. 62/325,661, filed on Apr. 21, 2016.

(51) Int. Cl.
| | | |
|---|---|---|
| *G01F 23/30* | (2006.01) | |
| *G01F 23/34* | (2006.01) | |
| *G01F 23/36* | (2006.01) | |
| *G01F 23/38* | (2006.01) | |
| *G01F 23/44* | (2006.01) | |
| *G01F 1/38* | (2006.01) | |
| *G01F 1/36* | (2006.01) | |

(52) U.S. Cl.
CPC ............. *G01F 1/38* (2013.01); *G01F 1/36* (2013.01); *G01F 23/30* (2013.01); *G01F 23/34* (2013.01); *G01F 23/36* (2013.01); *G01F 23/38* (2013.01); *G01F 23/44* (2013.01)

(58) Field of Classification Search
CPC .......... G01F 23/38; G01F 23/36; G01F 23/34; G01F 23/44; G01F 23/30; G01F 23/32
See application file for complete search history.

(56) References Cited

U.S. PATENT DOCUMENTS

| | | | | |
|---|---|---|---|---|
| 1,412,429 | A * | 4/1922 | Van Derbeck | G01F 23/34 235/117 R |
| 1,476,289 | A * | 12/1923 | Feder | G01F 23/36 338/157 |
| 1,483,418 | A * | 2/1924 | Dunbaugh, Jr. | G01F 23/34 73/318 |
| 1,522,355 | A * | 1/1925 | Winterhoff | G01F 23/36 123/41.15 |
| 1,772,626 | A * | 8/1930 | Desarzant | G01F 23/34 73/317 |
| 1,796,074 | A * | 3/1931 | Blakely | G01F 23/36 200/11 K |

(Continued)

*Primary Examiner* — David A Rogers
(74) *Attorney, Agent, or Firm* — Dinsmore & Shohl, LLP (57) ABSTRACT

A fluid level monitor incorporated into a fuel tank. A sensor module is adapted to being mounted to an exterior of the tank. A tube extends from the module within the tank and secures a housing at an interior location. The housing has a gear assembly, a float arm pivotally secures to the gear assembly and, in response to changes in a fluid level of the tank, causes the gear assembly to rotate a drive rod extending within the tube. A coupler forms a portion of the sensor module and is secured to an upper end of the drive rod. Rotation of the coupler relative to a PCB integrated into the sensor module produces an inductive signal indicative of the amount of displacement of the float and, consequently, the level of the fluid within the tank.

15 Claims, 6 Drawing Sheets

(56) References Cited

U.S. PATENT DOCUMENTS

| | | | | |
|---|---|---|---|---|
| 1,995,381 | A | * | 3/1935 | Drabin ............... G01F 23/36 338/33 |
| 2,325,582 | A | * | 7/1943 | Andersen ............ G01F 23/36 116/229 |
| 3,339,519 | A | * | 9/1967 | Taylor ................ G01F 23/34 116/229 |
| 3,688,795 | A | * | 9/1972 | Taylor ................ F16K 37/00 137/558 |
| 4,688,028 | A | * | 8/1987 | Conn ................ G01F 23/0015 137/558 |
| 5,305,639 | A | * | 4/1994 | Pontefract ........... G01F 23/54 200/840 |
| 6,564,632 | B2 | | 5/2003 | Ross, Jr. ............. G01F 23/34 73/290 R |
| 6,606,906 | B2 | * | 8/2003 | Arias ................. G01D 5/04 73/1.73 |
| 6,679,116 | B2 | * | 1/2004 | Ross, Jr. ............. G01F 23/34 73/290 R |
| 6,708,562 | B2 | | 3/2004 | Kruger ................ G01F 23/38 340/623 |
| 6,711,949 | B1 | * | 3/2004 | Sorenson ............. G01F 23/38 340/623 |
| 6,762,679 | B1 | * | 7/2004 | Diaz ................. G01F 15/063 340/524 |
| 7,062,967 | B2 | | 6/2006 | Hale et al. |
| 7,093,485 | B2 | | 8/2006 | Newman et al. |
| 7,191,648 | B2 | * | 3/2007 | Brill ................. G01D 5/145 73/313 |
| 7,219,686 | B2 | | 5/2007 | Schmitz et al. |
| 7,231,821 | B2 | * | 6/2007 | Fling ................. G01F 23/543 73/314 |
| 8,604,934 | B2 | * | 12/2013 | Ross, Jr. ............. G01F 23/32 340/438 |
| 2003/0084720 | A1 | | 5/2003 | Ross |
| 2003/0094044 | A1 | * | 5/2003 | Kruger ................ G01F 23/38 73/313 |
| 2004/0079152 | A1 | * | 4/2004 | Sorenson ............. G01F 23/38 73/313 |
| 2004/0129075 | A1 | * | 7/2004 | Sorenson ............. G01F 23/38 73/313 |
| 2006/0207324 | A1 | | 9/2006 | Ross |
| 2013/0146604 | A1 | | 6/2013 | Moreno et al. |
| 2014/0260603 | A1 | | 9/2014 | Blanchard et al. |
| 2014/0327432 | A1 | * | 11/2014 | Elliott et al. ........ G01D 5/2066 |
| 2015/0114100 | A1 | | 4/2015 | Ikeya et al. |
| 2015/0233695 | A1 | * | 8/2015 | Gomes et al. ....... G01D 5/2086 324/207.17 |
| 2015/0330828 | A1 | * | 11/2015 | Colvin, Jr. .......... G01F 23/38 702/55 |
| 2015/0369648 | A1 | * | 12/2015 | Bertalan ............. G01F 23/36 73/313 |

* cited by examiner

FLUID LEVEL MONITOR

CROSS-REFERENCE TO RELATED APPLICATIONS

This Application claims the benefit of U.S. Provisional Application 62/325,661 filed on Apr. 21, 2016, the contents of which is incorporated herein in its entirety.

FIELD OF THE INVENTION

The present invention is directed to a fluid level monitor supported within an interior of a fuel tank.

BACKGROUND OF THE INVENTION

Fuel level monitors having float arms which extend into the tank are well known. The float arm pivots in a housing. The position of the arm within the housing indicates the amount of travel of the arm consequently the level of the fuel tank. However, such devices require a large aperture within the tank to permit sufficient travel of the float arm upwardly and downwardly in response to the level of the fuel in the tank.

SUMMARY OF THE INVENTION

The invention discloses an improved fluid level monitor incorporated into a fuel tank. A sensor module is mounted atop an exterior of the tank and connects to a housing supported at an interior location of the tank via a tube extending between the sensor module and housing. The housing includes a gear assembly, a float arm pivotally secured to the gear assembly and, in response to changes in the fluid level of the tank, causing the gear assembly to rotate a drive rod within the tube for actuating an upper end situated coupler forming a portion of an inductive sensor assembly incorporated into the sensor module. The amount of rotation of the coupler produces a signal indicative of the amount of displacement of the float and, consequently, the level of the fluid within the tank. The signal is processed by a PCB integrated into the sensor module and outputted to a vehicle CPU.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
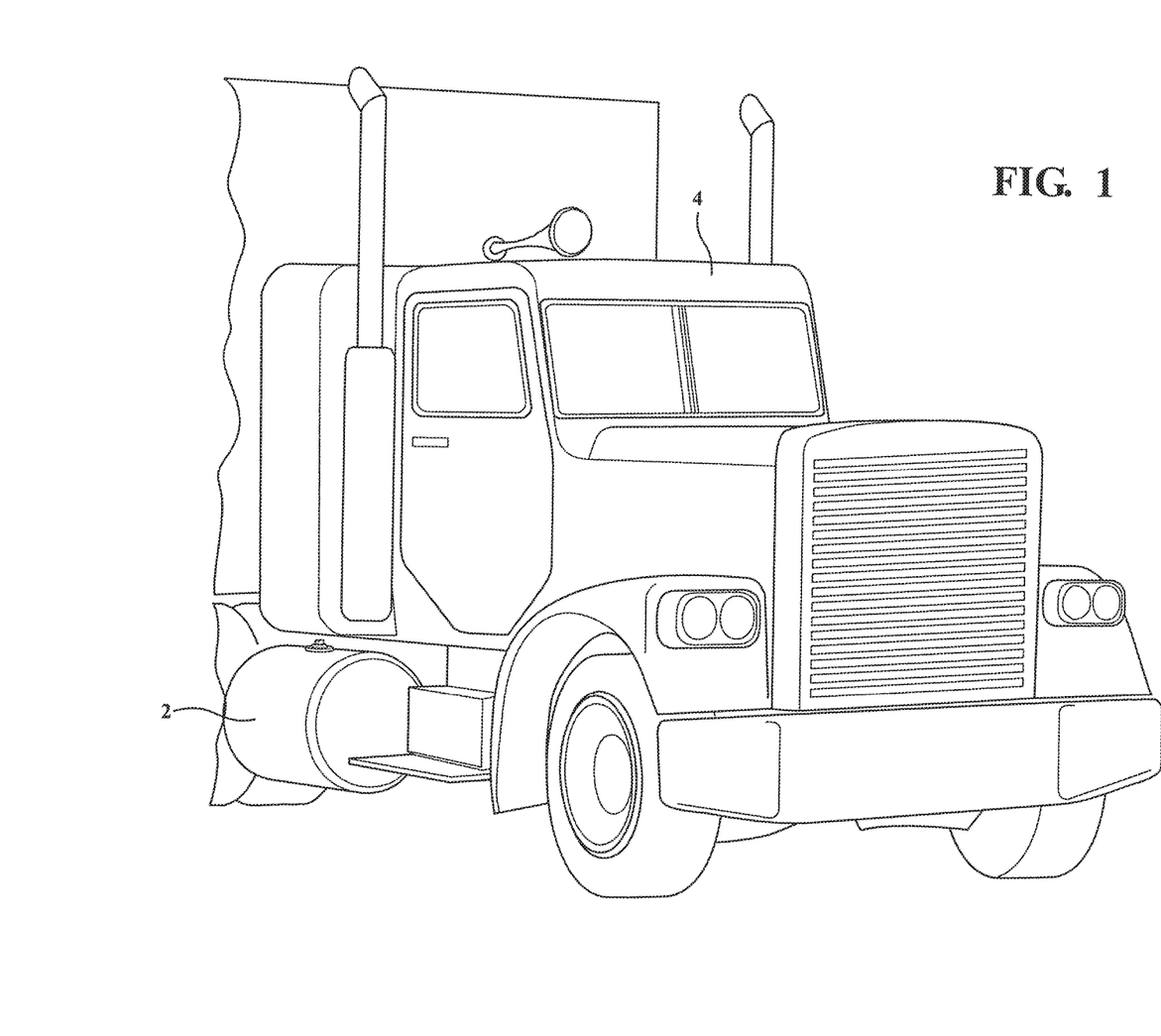
FIG. 1 is an environmental illustration of a larger sized vehicle, such as a truck or tractor, having a fuel tank adapted for use with the fuel level monitor of the present invention.
Figure 2:
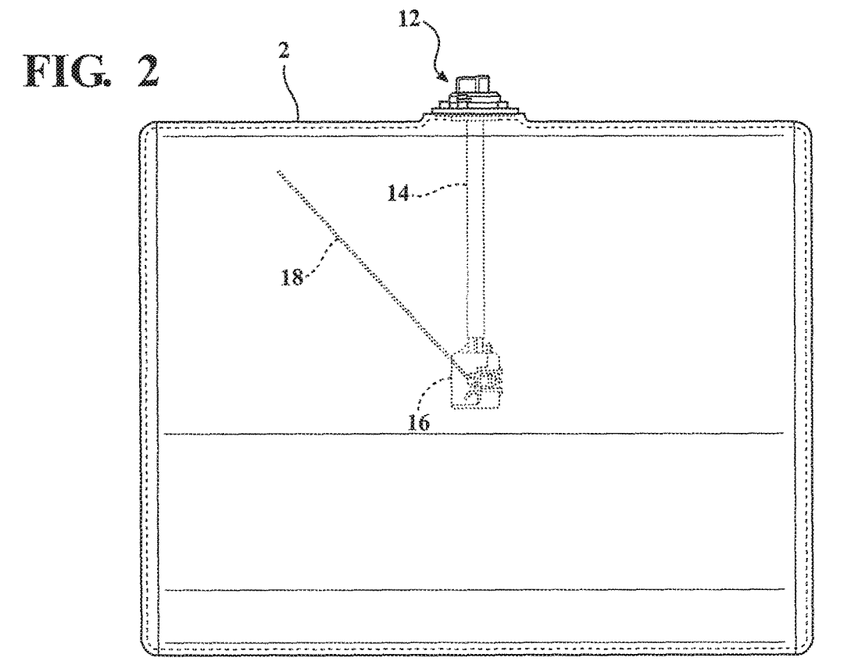
FIG. 2 is a side plan view of the fuel tank illustrating the sensor module mounted to a top exterior surface thereof, interior extending portions of the fuel level monitor being depicted in phantom and including a fixed tube depth extending supporting tube, bottom located housing and pivotally connected float arm.
Figure 3:
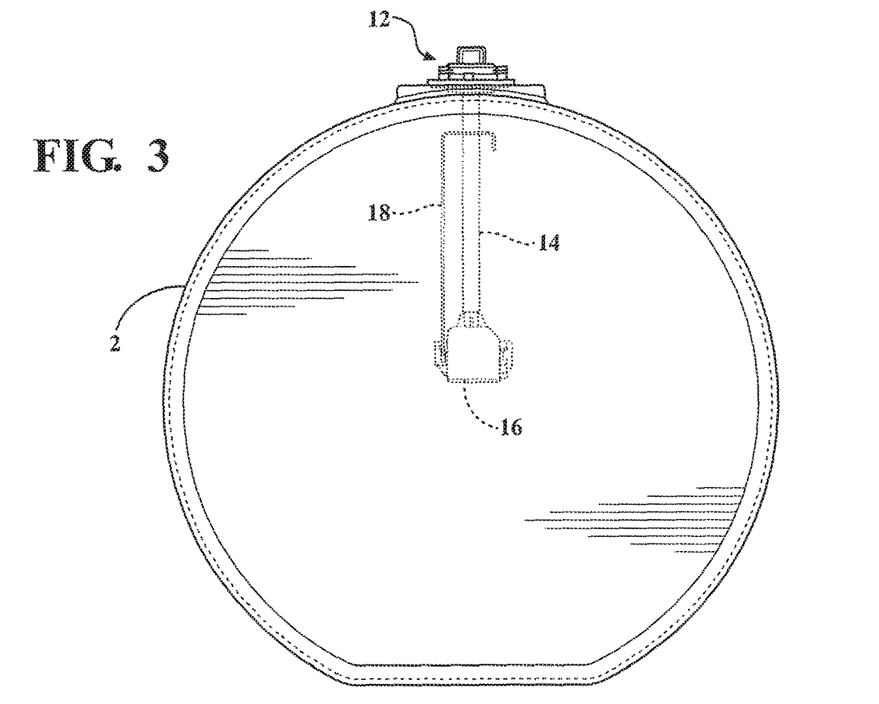
FIG. 3 is a rotated end plan view of the fuel tank and fuel level monitor of FIG. 2.
Figure 4:
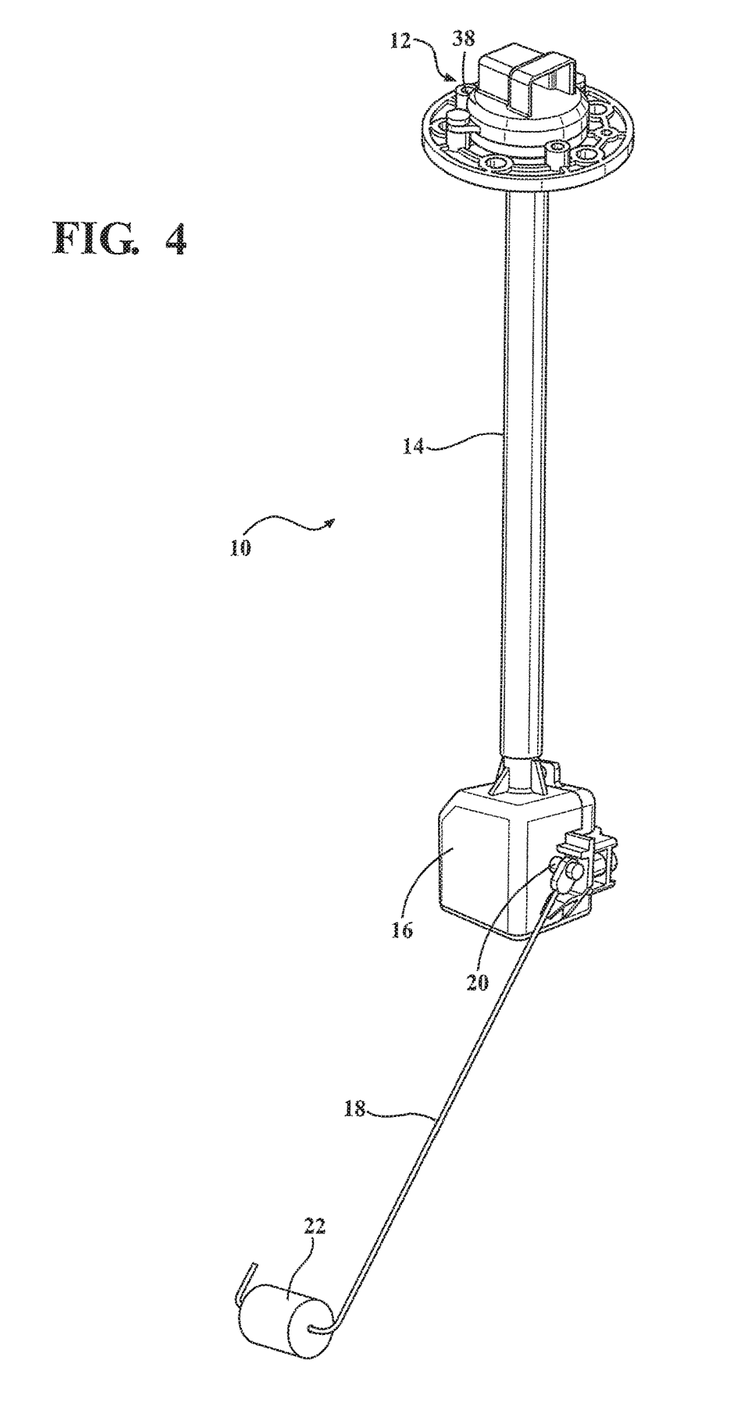
FIG. 4 is a perspective view of the fuel level monitor and illustrating the fixed outer tube extending between the upper sensor module and the lower tank interior suspended housing, the float arm supported to a rotating shaft projecting from the housing.

With reference now to FIGS. 1-7, an improved fluid level monitor is provided, see as generally depicted at 10 in FIG. 4, in use with a tank 2. As further depicted in FIG. 1, the tank 2 can be associated with larger sized vehicles such as a truck or tractor, as further referenced at 4.

FIGS. 2 and 3 are respective side plan and end plan views of the fuel tank 2, each exhibiting an upper end located sensor module 12 of the fluid level monitor which is adapted to being mounted to an exterior of the fuel tank 2. The tank 2 includes an aperture, such being formed in a top location as shown, and over which is secured a lower flange portion of the sensor module (a further description of the sensor module subsequently being had with reference to FIGS. 6 and 7).

The interior extending portions of the fuel level monitor are depicted in phantom in each of FIGS. 2 and 3 and include a tube 14 extending from the sensor module 12 downwardly within an interior of the tank 2 and securing, at an opposite end, a housing 16 which is suspended within the tank 2. As shown in FIGS. 2-3, housing 16 can be positioned at a vertical midpoint within the tank interior. A float arm 18 attaches at a proximal end to a shaft 20 projecting from the housing 16, with a distal extending end including a buoyant element such that the distal end follows a current fluid level within the tank between any of an empty-most position in which the distal end of the float arm is positioned substantially in vertical alignment with the tube 14 and a fully filled position in which the float arm is rotated up to 180° relative to the empty most position and so that the buoyant element 22 is proximate to or in contact; with an upper extending portion of the supporting tube 14.

Figure 5:
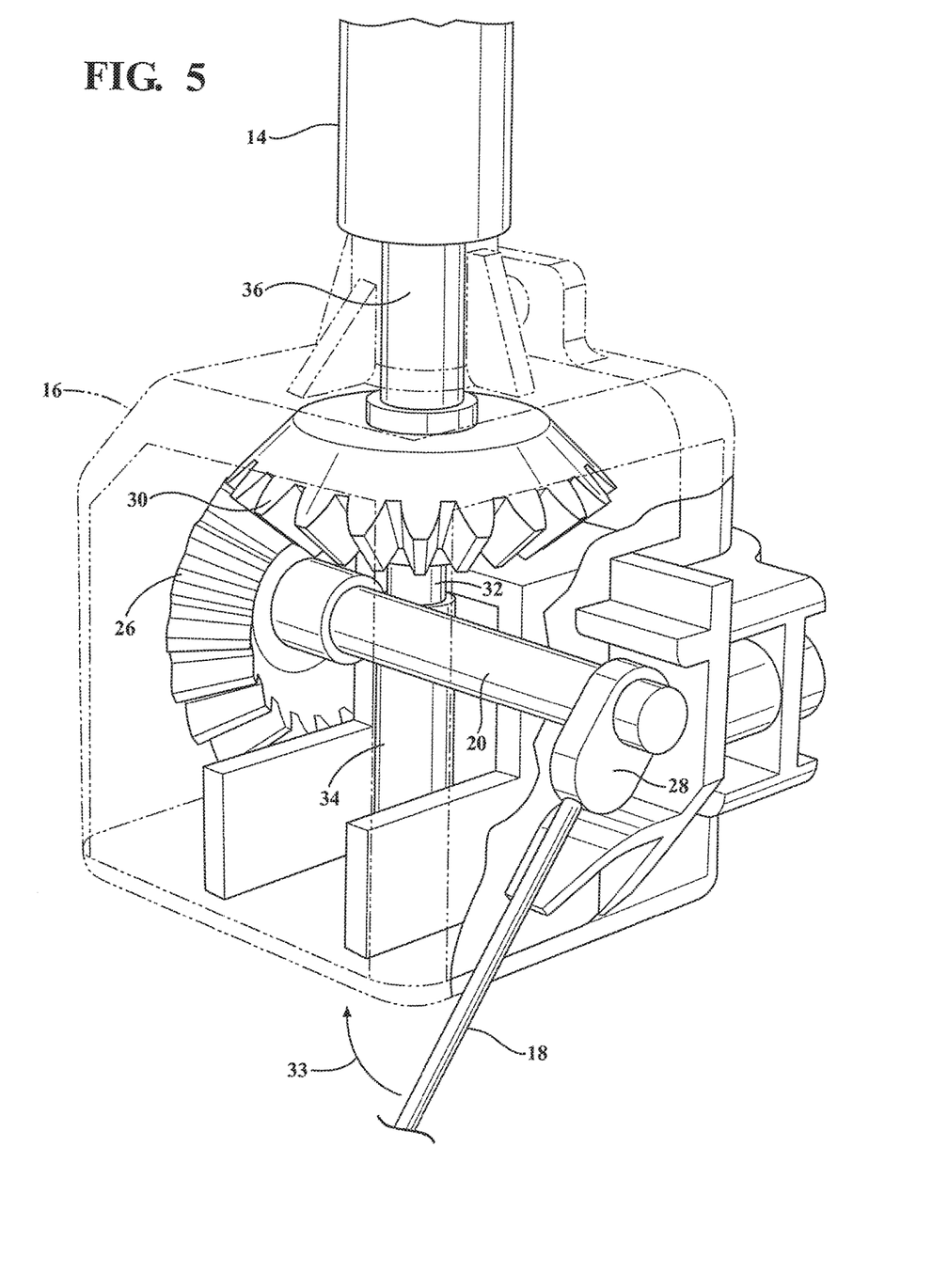
FIG. 5 is an enlarged and partial cutaway of the bottom supported housing and better illustrating the bevel gear arrangement for converting a pivoting float position to a rotated position of an inner drive rod which extends upwardly inside of the fixed outer tube to the upper located sensor module.

FIG. 4 is a perspective view of the fuel level monitor 10 and illustrates the fixed outer tube 14 extending between the upper sensor module 12 and the lower tank interior suspended housing 16. FIG. 5 is an enlarged and partial cutaway of the bottom supported housing 16, such exhibiting a generally cuboidal or three dimensional rectangular shape and better illustrating a bevel gear arrangement for converting the pivoting float position to a rotated position of an inner drive rod 24 (FIG. 6) which extends upwardly inside of the fixed outer tube 14 to the upper located sensor module 12.

As shown in FIG. 5, the gear assembly is incorporated into the housing 16. The housing may further include a removable cover or any other construction to permit access to its interior.

The gear assembly includes a first bevel gear 26 rotatably secured to shaft 20, so that the rotational axis of the first gear 26 and shaft 20 are supported in horizontally extending fashion within the housing. In one non-limiting arrangement, the first gear 26 and supporting shaft 20 are rotatably supported at one or more locations of the housing, such including an annular circumference of an aperture defined in the selected housing side wall and through which the shaft projects to an exterior housing location in order to secure the distal end of the float arm 18.

As further depicted in FIG. 5, and by non-limiting example, a proximal end coupler 28 of the float arm 18 exhibiting an interior recess may resistively engage over the circumferential extending profile of the shaft 20. The proximal end of the float arm 18 can also include any other type of snap-fit arrangement, such including any type of slot or protuberance which engages a suitable location of the first gear shaft 20. It is also envisioned that the float arm 18 and the shaft 20 can be provided as a single component.

A second bevel gear 30 is provided in a crosswise supported and mounted fashion within the housing 16 relative to the first bevel gear 26 such that the beveled teeth of the first gear 26 intermesh with those of the second gear 30. The second gear as shown is rotationally supported proximate an upper most interior of the housing such that a further shaft 32 extends from the second bevel gear 30 downwardly and seats within a cylindrical shaped support 34 mounted to a bottom interior of the housing 16.

Although not shown in FIG. 5, the drive rod (again at 24 in FIG. 6) extends in a linear upper direction from the second gear 30 relative to the lower supported shaft 32, through the upper wall of the housing 16 and through a stem 36 forming a lower integral extending portion of the tube 14. As will be further described in reference to FIGS. 6-7, the drive rod 24 is connected to a coupler portion of an induction sensor integrated into the sensor module such that the position of the float is transferred through the gear assembly and coupler to produce a signal indicating the position of the float and accordingly the fluid/fuel level in the tank.

Beyond the bevel gear configuration depicted in FIG. 5, it is understood that other gear or linkage arrangements can be alternately utilized within the housing 16 to convert the pivoted position of the float arm 18 to a calibrated and rotational output of the drive rod 24. It is further understood that the arrangement and manner of securing the float arm to an input rotating shaft (such as shown at 20) of the gear assembly can be modified from that shown. The support structure depicted in the housing interior for maintaining the beveled arrangement of the gears 26 and 30 and their associated drive inputs 20 and 32 is further understood to be likewise configurable as necessary for supporting the internal components and for converting the pivoting input of the float arm 18 (see directional arrow 33) to a rotational induced output (at 35 in FIG. 6) associated with the drive rod 24.

Figure 6:
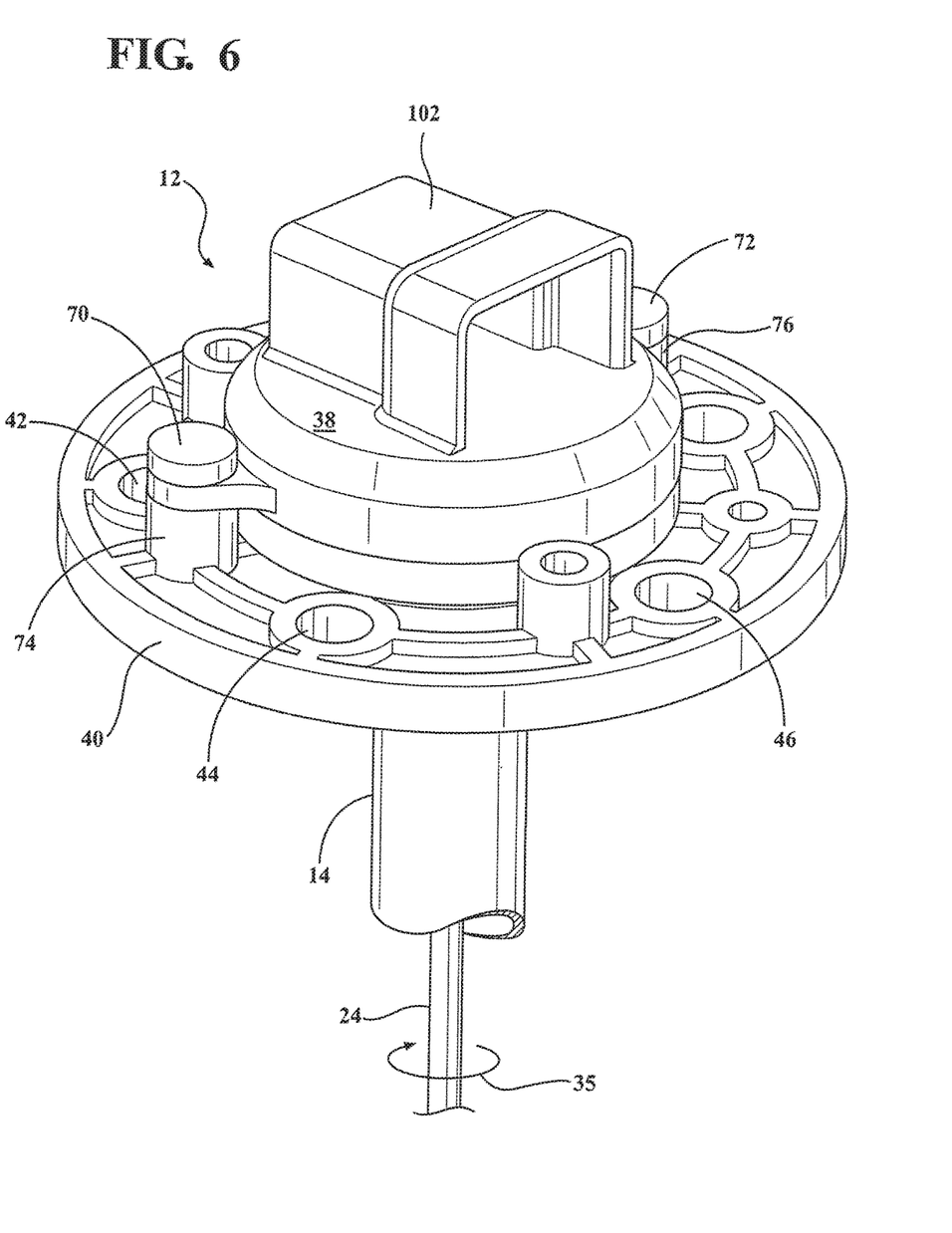
FIG. 6 is an illustration of the sensor module secured to the exterior of the fuel tank.
Figure 7:
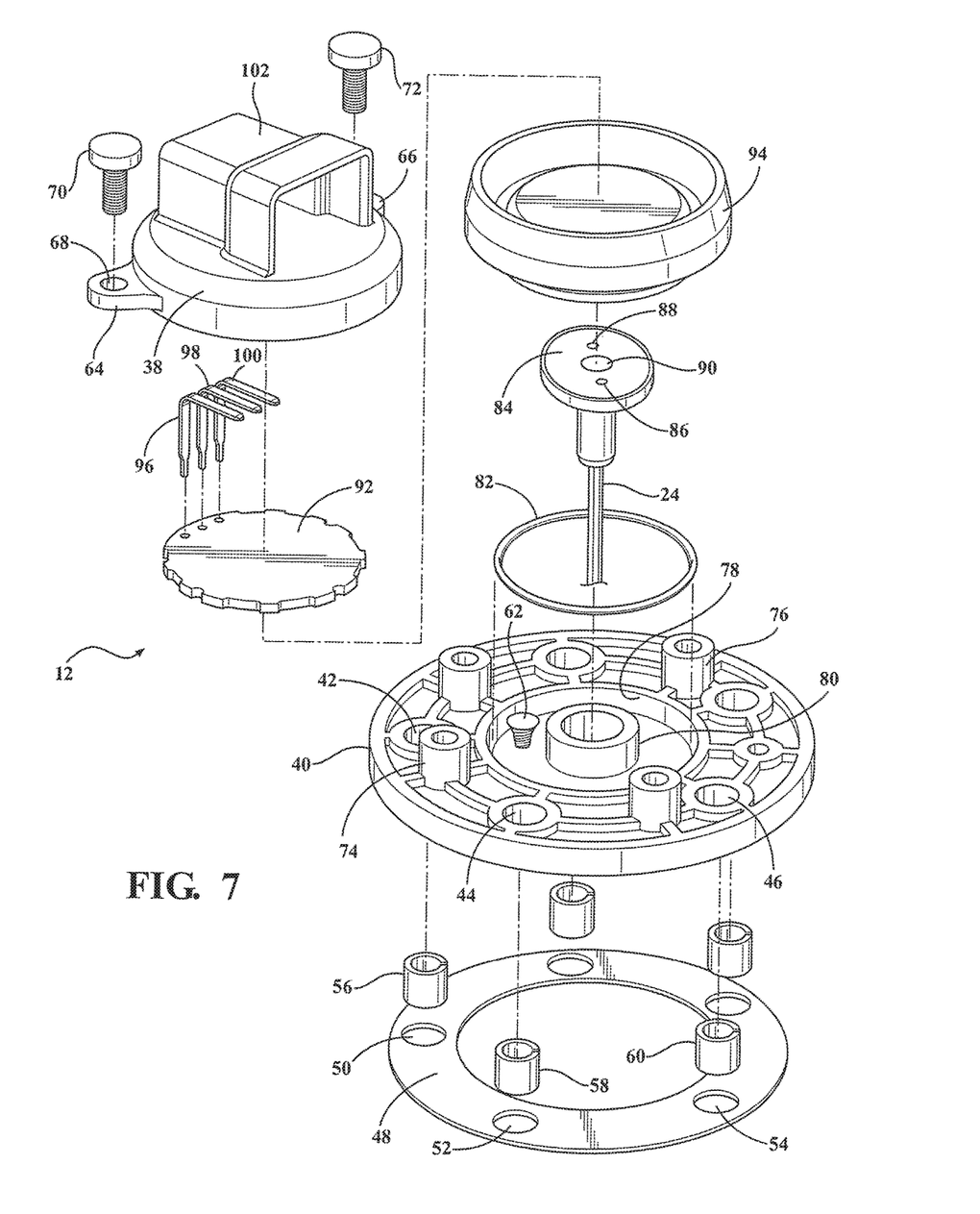
FIG. 7 is an exploded view of the sensor module and better illustrating the features of the housing, flange rotating coupler and proximately positioned PCB board with exciting/receiving coils for converting a rotated position of the coupler to a reference voltage output communicated to terminal pins extending from the board to a plug connector recess adapted to being communicated by a connector associated with a vehicle CPU.

Proceeding to FIGS. 6 and 7, a pair of assembled and exploded perspectives are depicted of the sensor module 12 secured to the exterior of the fuel tank. The sensor module includes a housing cover 38 which is mounted to a flange 40. The periphery of the flange has a set of apertures, at 42, 44, 46 et seq. for mounting to the tank 2.

As shown in FIG. 7, a gasket 48 is provided matching an underside profile of the flange 40 and includes a matching pattern of apertures, at 50, 52, 54, et seq., which align with the apertures 42, 44, 46 in the flange. In combination with a set of collar shaped and compressible sealing portions, at 56, 58, 60, et sq. which can compress into the apertures 42, 44, 46, a plurality of fasteners (an example shown at 62) are provided to engage through mounting locations of the tank surrounding its perimeter aperture edge and to compress the gasket 48 to the underside of the mounted flange 40 in order to establish a sealed arrangement around the perimeter aperture edge of the tank, such occurring following insertion of the extending tube 14 and end supported housing 16 and pivot float arm 18.

As further shown, the housing cover 38 exhibits a pair of bosses 64 and 66, these having apertures (shown at 68 for selected boss 64). An additional group of fasteners, see at 70 and 72, pass through the apertures in the boss and into additional apertures configured within selected collar shaped pedestal portions 74 and 76 extending upwardly from the flange 40, and in order to secure the housing cover 38.

Without limitation, the arrangement and configuration of fasteners can be modified from that shown and so that a single plurality of fasteners may mount the housing cover and flange collectively to the tank surrounding its insertion aperture. Alternatively, the housing cover can be secured by any of press fit, tab/slot or detent features (not shown) to the flange and without the requirement for fasteners. Also, the fasteners utilized for mounting the flange to the tank can be substituted by any of rivets or other form of permanent or temporary mounting structure, such as which can facilitate removal of the internal components of the fill level monitor for repair or replacement.

Referring again to FIG. 7, a central region associated with an upper surface of the flange 40 exhibits a coaxial spaced defined by an inwardly facing annular rim 78 and an opposing outwardly facing central annular surface 80, these forming a central pocket therebetween. The center of the pocket is characterized by a collar defining the outer annular surface 80, such having a circular aperture for receiving the drive rod 24 extending upwardly from the gear assembly (collectively housing 16). An O-ring 82 extends upon the inner surface of the pocket (against the inwardly facing rim edge 78) to form a seal.

A coupler subassembly 84 is mounted to the end of the rod 24 so that it is supported upon the flange 40 (defined as within a lower chamber of the sensor module). The coupler 84 includes an inductive coupler (see portions 86/88) and a coupler holder (further at 90) which are supported upon an upper facing surface of the coupler. In one non-limiting embodiment, the coupler 84 is shown elliptically shaped however can be otherwise configured within the scope of the invention.

A PCB board 92 is shown and which is supported atop a depth defining partition member 94, in turn secured upon the gasket 40 so that it is positioned over the coupler 84 and the pocket in order to form a lower chamber within the sensor module. The PCB board contains an arrangement of exciting coils and receiving coils according to known inductive sensor arrangements such that rotational movement of the coupler 84 with respect to the coils integrated into the PCB board creates an electrical signal in the receiving coils which is proportional to the amount of rotation of the coupler with respect to the coils.

By way of ancillary explanation, it is further known in the relevant art that inductive sensors, such according to generally known operating protocols, include a resonator which creates an oscillating signal which produces eddy (circular) currents in the receiving coils when these are coupled. As the coupler moves along a longitudinal axis of the coils, a reference voltage is measured, this being proportional to the travel thus indicating the position of the coupler (and thereby that of the pivotally associated float arm).

Terminals, shown at 96, 98 and 100, extend from the PCB 92 through the outer housing cover 38 and are accessed by a separate plug connector (not shown) associated with a vehicle CPU or the like. The plug connector is shaped so that is received through an opening in a hood shaped portion 102 integrally configured with the housing cover 38 and to engage the ends of the terminals 96-100.

Thus, upward or downward movement of the float rod 18 in connection with the level of fuel in the tank 2 results in placing a torque upon the first bevel gear which in turn rotates the second bevel gear to turn the connecting rod and coupler within the lower chamber. The amount of rotation of the coupler with respect to the receiving coils then produces a signal indicative of the amount of displacement of the float and consequently level of fuel in the tank. The signal is processed by the PCB 92 and delivered to the terminals and sensor connector for delivery to a vehicle control system and driver display.

Having described our invention, other and additional preferred embodiments will become apparent to those skilled in the art to which it pertains, and without deviating from the scope of the appended claims. This can include substituting the inductive sensor arrangement disclosed with any type of related Hall effect or other proximity sensor arrangement which provides for converting a coupler rotated input, resulting from the fluid level inducted rotation of the drive rod, to a PCB generated signal output representative of a present fill level of the tank.

We claim:

1. A fluid level monitor incorporated into a fuel tank, comprising:
    a stationary supported housing mounted inside the tank having a gear assembly, a float arm pivotally secured to said gear assembly;
    a sensor module further including a housing cover mounted to a flange, a periphery of said flange mounting to the tank;
    said housing cover further including a pair of bosses having apertures, fasteners inserting through the apertures in said bosses and into additional apertures configured within collar shaped pedestal portions extending upwardly from said flange to secure said housing cover;
    said sensor module incorporating a rotational position sensor interconnected to said gear assembly by a rod;
    displacement of said float arm producing a signal indicative of a fluid level within the tank.

2. The fluid level monitor of claim 1, further comprising a tube extending from said sensor module and securing said housing.

3. The fluid level monitor of claim 1, said rotational position sensor further comprising a coupler rotating relative to an arrangement of inductive coils integrated into a PCB located within said sensor module.

4. The fluid level monitor of claim 3, said coupler further comprising an elliptical shape.

5. The fluid level monitor of claim 1, said gear assembly further comprising a first bevel gear having a shaft securing said float arm, a second bevel gear rotated by said first gear and further connecting to said rod.

6. The fluid level monitor of claim 1, further comprising said housing being located at a vertical interior midpoint location of the tank.

7. The fluid level monitor of claim 1, further comprising mounting apertures in said flange periphery for receiving fasteners.

8. The fluid level monitor of claim 1, further comprising a central pocket configured atop said flange for supporting said coupler, a partition member located above said coupler and supporting said PCB board.

9. The fluid level monitor of claim 1, further comprising terminals extending from said PCB to a plug connector recess formed in said housing cover.

10. A fluid level monitor incorporated into a fuel tank, comprising:
    a housing mounted inside the tank and having gear assembly, a float arm pivotally secured to said gear assembly;
    a sensor module mounted to an exterior of the tank, a partition member within said sensor module supporting a PCB;
    a tube extending between said sensor module and said housing;
    said sensor module incorporating a rotational position sensor interconnected to said gear assembly by a rod extending within said tube;
    said rotational position sensor further including a coupler located underneath said partition member, said coupler rotating relative to an arrangement of inductive coils integrated into said PCB;
    displacement of said float arm producing a signal indicative of a fluid level within the tank.

11. The fluid level monitor of claim 10, said gear assembly further comprising a first bevel gear having a shaft securing said float arm, a second bevel gear rotated by said first gear and further connecting to said rod.

12. The fluid level monitor of claim 10, further comprising said housing being located at a vertical interior midpoint location of the tank.

13. The fluid level monitor of claim 10, said sensor module further comprising a housing cover mounted to a flange, a periphery of said flange mounting to the tank.

14. A fluid level monitor incorporated into a fuel tank, comprising:
    a stationary supported housing mounted inside the tank having a gear assembly, a float arm pivotally secured to said gear assembly;
    a sensor module further including a housing cover mounted to a flange, a periphery of said flange mounting to the tank;
    a central pocket configured atop said flange for supporting said coupler, a partition member located above said coupler and supporting said PCB board;
    said sensor module incorporating a rotational position sensor interconnected to said gear assembly by a rod;
    displacement of said float arm producing a signal indicative of a fluid level within the tank.

15. The fluid level monitor of claim 14, further comprising an O-ring supported between said partition member and said flange.

* * * * *